INVENTORS:
PAUL M. PAN
CHARLES B. MAYER
BY George V. Eltgroth
ATTORNEY.

INVENTORS.
PAUL M. PAN
CHARLES B. MAYER
BY George V. Eltgroth
ATTORNEY.

United States Patent Office 3,066,294

Patented Nov. 27, 1962

3,066,294

HELICAL ANTENNAS COUPLED TO CIRCULAR WAVEGUIDE CARRYING ORTHOGONAL MODES

Paul M. Pan, North Syracuse, and Charles B. Mayer, Niskayuna, N.Y., assignors to General Electric Company, a corporation of New York Filed Mar. 18, 1957, Ser. No. 646,769
11 Claims. (Cl. 343—843)

This invention relates to radio frequency energy transfer systems, and more particularly to systems for transmitting or receiving radio frequency energy which may carry different information; for example, a system for radiating both the sound and picture components of a television signal.

In broadcasting television programs to television receivers in a surrounding area, it is of great importance for proper reception that both the picture signal and the sound signal, which are generated by separate transmitters and at carrier frequencies differing by 4.5 megacycles, be received at about the same strength. One solution was to mount both the picture and sound transmitting antennas on a high tower or high building. However, it was found that due to the close proximity of the sound and picture antennas energy was coupled from one transmitter to the other transmitter. Such coupling interfered with the operation of the system. Since it was not practical to separate the picture and sound antennas, a radiation system was developed which permitted mounting of the picture and sound antenna systems on the same mast by using complex filter equipment to prevent the transfer of energy between the transmitters. The improved results achieved by the use of the filter equipment created a demand for an even better system because, in addition to being expensive, the filter equipment acted as a limit on the power of the transmitter which in some cases limited the broadcasting area of the television station and deprived many people of the opportunity to view television. In addition, the filter equipment reduced the bandwidth of the radiating system; that is, the system would be limited to operating in a relatively narrow frequency range which in some cases would impair the quality of the broadcast.

Therefore, an object of the invention is to provide an improved system for broadcasting the picture and sound signals of a television station.

A more general object of the invention is to provide an improved radio frequency energy transfer system.

Another object of this invention is to provide an improved system for radiating more than one signal from the same location.

A specific object of this invention is to eliminate the need for expensive filter equipment for radiating systems for television broadcast stations and therefore permit higher power and better quality transmission at a lower cost.

The invention is embodied in apparatus for reducing to a negligible amount the coupling between the video (picture) energy transmitter and the aural (sound) energy transmitter by coupling the energy by means of a separate wave guide from each transmitter to a transducer. (A wave guide is a hollow pipe which is used for conducting electrical energy by the reflecting action of its walls. The same guide can operate with several types or modes of wave vibration so that different kinds of information can be separably transmitted at the same time by way of different modes.) The transducer is connected to a circular wave guide and causes the aural energy and the video energy to be propagated in orthogonal modes into the circular wave guide (i.e., the wave vibrations of the aural and video energy are at right angles). An aural energy probe is mounted in the side of the circular wave guide and projects into the circular wave guide and is orientated to be excited only by the aural energy. A video energy probe is mounted in the side of the circular wave guide and projects into the circular wave guide at a right angle to the aural energy probe and therefore is excited only by the video energy. Each of the probes is connected to an antenna which encircles the circular wave guide.

A feature of the invention is separate helical antennas for radiating the video and aural energy which cross as they wind around the circular wave guide.

Coupling between the video and aural transmitters is reduced to a negligible amount because the aural energy and the video energy are isolated from each other within the circular wave guide since they are propagated in the form of orthogonal modes, and because coupling between the helical antennas is reduced to a negligible amount particularly with the cross-wound arrangement of the two helices.

Another feature of the invention is the transducer which, because of a novel construction, readily propagates the audio and video energy in orthogonal modes while preventing the coupling of energy between the aural energy and video energy input openings.

An advantage of the invention is that the circular wave guide also functions as the mast with the helical antennas mounted on insulators. This permits the ready mounting of the whole radiating system at the top of a high tower or high building.

Another advantage of the invention is that the antenna system may readily be arranged vertically in a number of bays to increase the area of broadcasting by concentrating the radiation in the radial direction.

A further advantage of the invention is that all of the energy is radiated due to the complete coupling of the energy to the antenna by the probes and due to the radiation efficiency of the antennas.

While the invention has been briefly described, by way of example, in connection with a television broadcasting, it should be noted that the invention works equally as well for transmitting or receiving radio signals of many other types such as occurs in radar, communication and radio navigation systems.

Other advantages, and additional objects and features of the invention will become apparent from the following detailed description which is accompanied by drawings in which.

Figure 5:
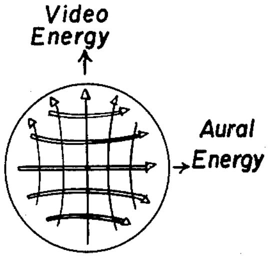
Figure 3:
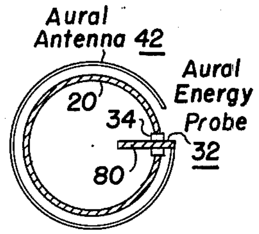
Figure 4:
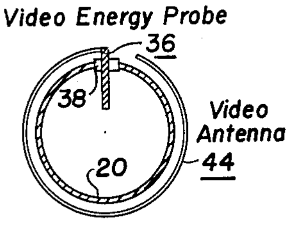
Figure 6:
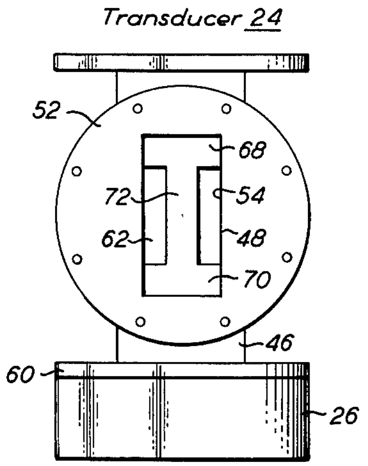
Figure 7:
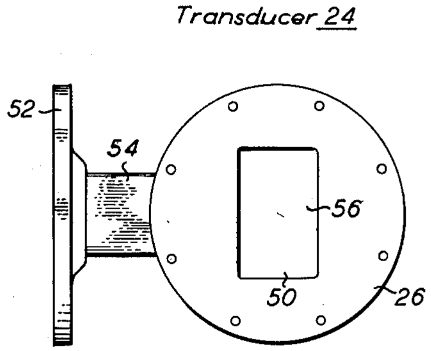
Figure 9:
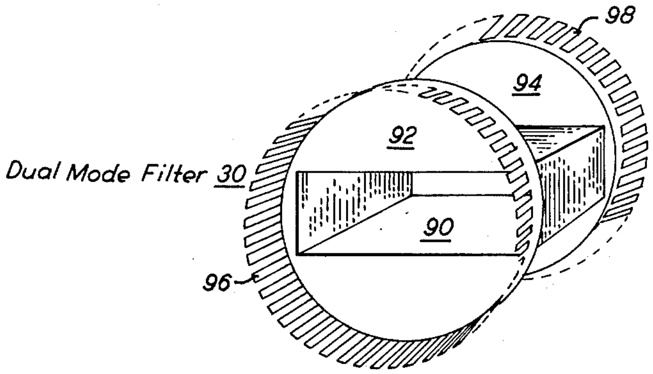
Figure 10:
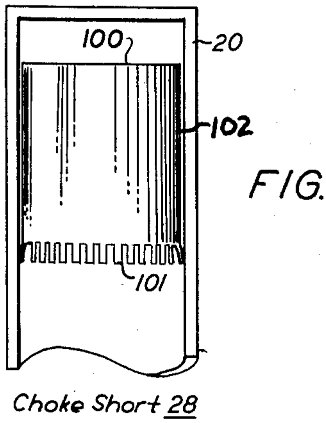
Figure 8:
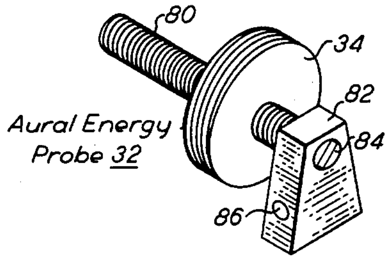

FIGURE 3 schematically illustrates how the aural energy probe is orientated within the circular wave guide;

FIGURE 4 schematically illustrates how the video energy probe is orientated within the circular wave guide;

FIGURE 5 schematically illustrates the orientation of the aural energy and the video energy which is propagated in orthogonal modes within the circular wave guide by the tansducer;

FIGURE 6 is a front elevational view of the transducer showing the aural energy input opening;

FIGURE 7 is a bottom view of the transducer showing the video energy input opening;

FIGURE 8 is a perspective view showing the detailed construction of the aural energy probe;

FIGURE 9 is a perspective view of the dual mode filter which is supported within the circular wave guide (as shown in dotted outline in FIGURE 2) and which functions to reflect video energy; and FIGURE 10 is a schematic cross-sectional illustration of the choke short mounted at the top of the circular wave guide (as shown in dotted outline in FIGURE 2) which functions to reflect aural energy.

*General Description of System*

Figures 1, 2:
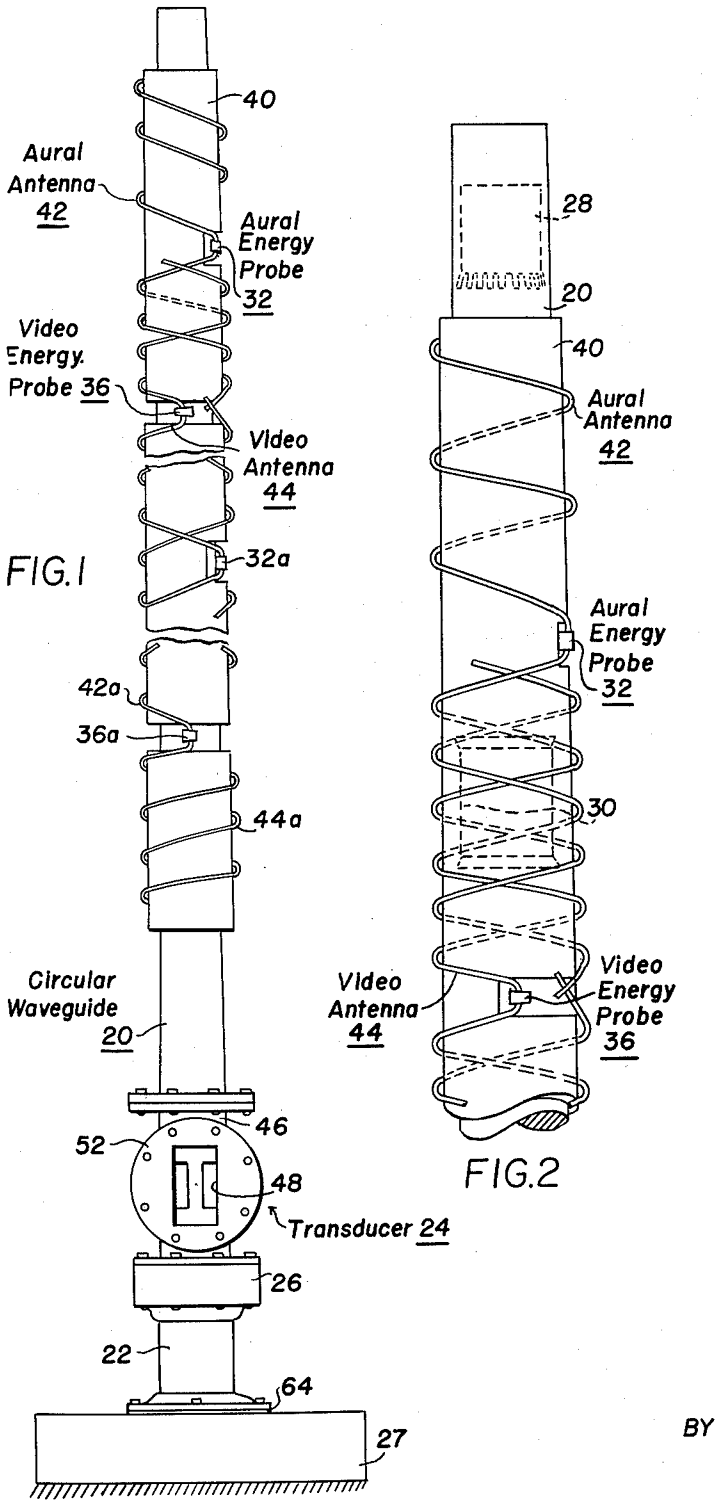
FIGURE 1 shows a radiation system in accordance with a two-bay embodiment of the invention in which the aural and video energy is propagated in orthogonal modes within the circular wave guide mast by a transducer, and the aural and video energy is radiated by separate helical antennas which are cross-wound to reduce coupling.
FIGURE 2 is a more detailed view of the top bay of the radiation system of FIGURE 1 illustrating the cross-wound helices and the positions of the aural and video energy probes.

A two-bay system for radiating video and aural energy in accordance with one embodiment of the invention is shown in FIGURE 1. The system generally comprises a circular wave guide 20, which also functions as a mast. The circular wave guide 20 is connected to the wave guide support 22 by means of the transducer 24 and the transformer 26 which are connected together. The wave guide support 22 in turn is mounted on support means such as the support mount 27. A choke short 28 (FIG. 2) is connected at the top of the circular wave guide 20 and a dual mode filter 30 (FIG. 2) is supported within the circular wave guide 20.

Since the top and bottom bays of the two-bay system are similar, merely the top bay need be descirbed in detail and will be described first. An aural energy probe 32 (FIGS. 1, 2, 3 and 8) is mounted in an insulator 34 (FIG. 3), which is fixed within the side of the circular wave guide 20, and projects toward the center of the circular wave guide 20. A video energy probe 36 is mounted in an insulator 38 (FIG. 4) and is positioned a distance below the aural energy probe 32 and ninety degrees around the circular wave guide 20 so that the video energy probe 36 projects towards the center of the circular wave guide 20 at a right angle to the aural energy probe 32.

The aural and video energy probes 32 and 36, the choke short 28, the dual mode filter 30 and the circular wave guide 20 can be considered as a coupling system for coupling energy propagated from the transducer 24 to the aural antenna 42 and video antenna 44 which comprise the antenna system.

Insulating means, such as the plurality of insulators 40 (FIGS. 1 and 2) or the equivalent, are supported around the circular wave guide 20 and support the aural antenna 42 which is connected ot the aural energy probe 32 and the video antenna 44 which is connected to the video energy probe 36. The aural antenna 42 and the video antenna 44 are each of the helical type and in the illustrated embodiment are cross-wound around the circular wave guide 20 at their overlapping portion.

The bottom bay of the two-bay system (FIG. 1) is similar to the top bay (except for the dual mode filter 30 and choke short 28) with corresponding parts indicated by the same reference character but with an "*a*" designation added.

Generally, the system operates in the following manner:

The aural energy is fed to the side of the transducer 24 (FIG. 1) and is propagated in the circular wave guide 20 in a given mode (FIG. 5). The video energy is fed via the wave guide support 22 and transformer 26 to the transducer 24 which propagates the video energy in a mode which is orthogonal to the mode of the aural energy. The aural energy probe 32 (FIG. 3) is orientated to be excited by the aural energy and not by the video energy, and the video energy probe 36 (FIG. 4) is orientated to be excited by the video energy and not by the aural energy. Therefore, there is practically no coupling between the video energy and aural energy within the circular wave guide 20. Further, since the aural antenna 42 and the video antenna 44 are separate from each other and are cross-wound, there is practically no coupling between the antennas. Thus, no substantial amount of energy is coupled from one transmitter to the other so that expensive filter equipment is not required. Other features of the invention such as the choke short 28 and the dual mode filter 30 also aid in minimizing coupling between the video and oral transmitters as will be hereinafter indicated.

*Transducer*

The transducer 24 (FIGS. 1, 6 and 7) functions to excite the video energy and aural energy in orthogonal modes with sufficient bandwidth and isolation between the video energy input and the aural energy input.

The transducer 24 generally comprises the circular wave guide 46 having a rectangular aural energy opening 48 through its side for the aural energy input with a rectangular video energy opening 50 (FIG. 7) at its lower end for the video energy input.

A flange 52 (FIGS. 6 and 7) is coupled to a rectangular wave guide (not shown) which transfers the aural energy from the aural energy transmitter to the transducer 24. The flange 52 is connected to the rectangular wave guide section 54 which is attached over the aural energy opening 48 (FIG. 6). A resonant window 62 is provided for the aural energy opening 48 for matching purposes.

Video energy is transferred from the video energy transmitter via a rectangular wave guide (not shown) to the rectangular passage 56 (FIG. 7) in the transformer 26. The transformer 26 is connected at the top end to the flange 60 (FIG. 6) of the transducer 24. The bottom end of the transformer 26 is connected to the wave guide support 22 (FIG. 1) which is in the form of a wave guide extension of the wave guide (not shown) which feeds the video energy to the radiation system. The wave guide support 22 is connected by the insulating support connector 64 to the support mount 27.

In order to explain the operation of the transducer 24 and transformer 26, the wave guide terminology employed to describe various modes will be briefly explained.

A wave guide is a hollow pipe which is used for conducting electrical energy by reflecting waves back and forth along its length. Electrical energy is propagated within the wave guide in the form of waves. The waves can be defined in terms of wave length and mode of vibration. The wave length of a wave is a function of the period of time between corresponding parts in successive waves. The wave length is inversely proportional to frequency (i.e., the higher the frequency the shorter the wavelength).

The mode of vibration relates to the three-dimensional field pattern of the waves. The mode of vibration of the electrical field in a rectangular wave guide is transverse, (i.e., from one side of the rectangular cross-section of the wave guide to the other). The modes are designated by the letters TE which stand for transverse electric. The TE mode is further defined by one subscript which is the number of half-wave variations in field intensity to be found traveling one way across the rectangle and a second subscript which is the number traveling the other transverse dimension. Thus, the $TE_{10}$ mode means the transverse electric mode having only one half-wave variation in field intensity across the long dimension of the rectangle and no variation across the short dimension of the rectangle. Thus, in the case of a rectangular wave guide, the $TE_{10}$ mode is the only mode that will propagate if the narrow dimension of the rectangular wave guide is less than a half of a wavelength and therefore beyond cut-off and the wide dimension is made between one-half and one wavelength. (The cut-off frequency of a wave guide is the frequency at which the attenuation of the waves begins to rise rapidly because the rectangular dimension is not large enough to permit the waves to vibrate back and forth along the side of the wave guide.) Further, electrical energy in the $TE_{10}$ mode can be fed from a rectangular wave guide to a circular wave guide having a circular cross-section sufficient in size to enclose a square having its side dimension substantially equal to the longer dimension of the rectangular cross-section of the rectangular wave guide. This will permit the propagation of a $TE_{11}$ mode in the circular wave guide and the $TE_{11}$ mode is orientated in accordance with the orientation of the rectangular wave guide. It should be emphasized that in the below description the $TE_{10}$ mode refers to rectangular wave guides and the $TE_{11}$ mode to circular wave guides.

This principle makes possible the propagation of orthogonal modes within the circular wave guide 20 by the transducer 24 and the transformer 26.

The transformer 26 (FIG. 6) is a quarter-wave transformer section which matches the circular wave guide 46 to the rectangular wave guide support 22 (FIG. 1) which is of slightly different impedance. The transformer 26 which feeds the video energy to the circular wave guides 46 and 20 (FIG. 1) excites a $TE_{11}$ mode from a $TE_{10}$ mode in the wave guide support 22. The diameters of the circular wave guides 46 and 20 are the same and are chosen so that only the $TE_{11}$ mode will propagate. Thus, video energy fed via the transformer 26 to the transducer 24 is propagated in the circular wave guide 20 in a specific mode ($TE_{11}$) which is orientated in accordance with the orientation of the rectangular passage 56 in the transformer 26.

Aural energy in the $TE_{10}$ mode is fed via the rectangular wave guide section 54 (FIG. 7) to the aural energy opening 48 (FIG. 6) and propagated in the circular wave guides 46 and 20 in the $TE_{11}$ mode. Since the orientation of the aural energy opening 48 is perpendicular to the orientation of the rectangular passage 56 (FIG. 7) which forms the video energy opening 50, the aural energy is propagated in the circular wave guide 20 in a mode at a right angle to the mode of the video energy. Further, since the aural energy mode is perpendicular to the orientation of the video energy opening 50, the aural energy cannot propagate into the wave guide support 22 and be fed to the video transmitter. This is because the smaller perpendicular dimension of the video energy opening 50 places it beyond cut-off for aural energy; i.e., the smaller perpendicular dimension of the video energy opening 50 is not large enough to permit the aural energy which is orientated parallel to such smaller perpendicular dimension to pass through. It should be recalled that the aural energy carrier frequency is 4.5 megacycles higher than the video energy carrier frequency; the relationship of their respective wave lengths is inverse.

In addition, the aural energy opening 48 is arranged to be a quarter wavelength away from the position at which effectively a short for the video energy exists, as described in the next section. This prevents any video energy from being fed via the aural energy opening 48 to the aural energy transmitter because the aural energy opening 48 acts as a perfect short circuit for the video energy which propagates right through to the circular wave guide 20.

The resonant window 62 (FIG. 6) consists of the bars 68 and 70 positioned across the short sides of the rectangular aural energy opening 48 with the bar 72 positioned between the midpoints of the bars 68 and 70 across the aural energy opening 48. The resonant window 62 functions to prevent mismatch with respect to the video energy mode because the correct capacitance and rectance are chosen so that no resonant phenomenon will exist within the frequency band of operation.

The resonant window 62, due to its unique construction, also functions to increase the bandwidth of the system because the bars 68 and 70 introduce inductive reactance and the bar 72 introduces capacitative reactance. This increases the bandwidth because it eliminates the mismatch of video energy as well as providing the correct reactance to the aural energy. The resonant window 62 also eliminates the complicated method of matching by means of introducing either capacitance or reactance at different discontinuities to increase the bandwidth.

Thus, the transducer 24 functions to propagate the video energy and the aural energy in orthogonal modes in the circular wave guides 46 and 20 while preventing coupling between the aural and video energy openings 48 and 50 so that substantially all of the energy is transmitted to the circular wave guide 20 and substantially no energy is fed from one transmitter to the other.

It should be noted that other than orthogonal modes may be used, that the circular wave guide 20 may be replaced by a square wave guide, and that other than $TE_{11}$ modes may be employed, but only at the expense of substantial complication with consequent reduction in efficiency and increase in cost.

*Coupling System*

The aural and video energy in the circular wave guide 20 (FIG. 2) is coupled to the antenna system by means of a coupling system comprising the aural energy probe 32 and video energy probe 36 together with the choke short 28 and the dual mode filter 30. The dual mode filter 30 generally functions to pass the aural energy and reflect the video energy while the choke short 28 generally functions to reflect the aural energy.

Since the construction of the video energy probe 36 is the same as the construction of the aural energy probe 32, only the aural energy probe 32 will be described in detail.

The aural energy probe 32 (FIG. 8) consists of the probe 80, the insulator 34 and the connector 82. The insulator 34 is preferably made of Teflon insulation and is threaded to mount in a threaded hole in the side of the circular wave guide 20 (FIG. 3). The insulator 34 is positioned so that the probe 80 is properly orientated with respect to the aural energy mode. The probe 80 is threaded so that the amount of projection of the probe 80 into the circular wave guide 20 is adjustable. The connector 82 (FIG. 8) is of trapezoidal shape with threaded holes such as hole 86 on each of the long sides to hold the ends of the helices.

If only one bay instead of the illustrated two-bay system is used, the aural energy probe 32 is designed to couple 100% of the aural energy to the aural energy antenna. If a two-bay system is used, then each aural energy probe 32 and **32*a* is adjusted to couple 50% of the aural energy to the associated aural antenna. The amount of coupling is a function of the amount of projection of the probe 80 into the circular wave guide 20**.

The video energy probe 36 is of the same construction as the aural energy probe 32. The video energy probe 36 is displaced ninety degrees along the circular wave guide 20 (FIGS. 2 and 4) and several half wavelengths away, for example, two and one-half wavelengths, with respect to the aural energy probe. The spacing of the aural energy and video energy probes 32 and 36 is mainly a function of the spacing of the associated antennas which is hereinafter described in detail.

The dual mode filter 30 (FIGS. 2 and 9) is positioned above the video energy probe 36 and functions to reflect the video energy while passing the aural energy. The dual mode filter 30 (FIG. 9) comprises the rectangular wave guide section 90 with the flanges 92 and 94 at ts ends. Around the edges of each of the flanges 92 and 94 are the fingertip shorts 96 and 98 respectively which contact the inside of the circular wave guide 20 at periodic points. The plates of the flanges separate the video energy mode in one plane while transmitting the aural energy mode which is at right angles to the video energy mode.

The dual mode filter 30 is one-half wavelength in length and is mounted one or more quarter wavelengths above the video energy probe 36 (FIG. 2). The dual mode filter 30 provides a short to reflect the video energy to the video energy probe 36 and to transmit the aural energy with very little reflection. Thus, the dual mode filter 30 functions to decrease the coupling between the aural and video energy modes.

The choke short 28 at the top of the circular wave guide 20 (FIGS. 1 and 2) functions to insure 100% coupling of the aural energy to the aural antenna 22 by reflecting the aural energy back to the aural energy probe 32.

The choke short 28 (FIG. 10) comprises the skirt 102 having the fingertip shorts 101 around its circumference. The fingertip shorts 101 contact the inside of the circular wave guide 20. The skirt 102, which is a quarter wavelength long, is connected to the cap 100 and is concentric to the circular wave guide 20. The diameter of the cap 100 is less than the diameter of the circular wave guide 20 so that the skirt 102 is spaced from the circular wave guide 20 by an amount which produces the flange capacitance necessary for compensation; for example, .031 inch.

The effective position of the short provided by the choke short 28 is a number of quarter waves above the aural energy probe 32; for example, five quarter waves.

In summary, the aural and video energy propagated by the transducer 24 into the circular wave guide 20 is coupled to the antenna system while being isolated from each other.

*Antenna System*

The video and aural energy propagated in the circular wave guide 20 by the transducer 24 is coupled to the antenna system. The antenna system may be a single helix which is fed at opposite ends by the video energy and the aural energy and which provides substantial decoupling. A helical antenna of this type is described and claimed in the copending United States application of Lloyd O. Krause and Howard G. Smith, Serial No. 271,374, filed February 13, 1952, since abandoned in favor of continuation application, Serial No. 732,482, filed May 2, 1958, now Patent No. 2,985,878, issued May 23, 1961, and assigned to the same assignee. However, it is preferable, in order to provide even greater decoupling, to employ separate helices either paraller or cross-wound with the same or different radii, either completely interlaced or partially interlaced, of the types described and claimed in the copending United States application of Paul M. Pan, Serial No. 646,837, filed March 18, 1957, now Patent No. 3,019,438, and assigned to the same assignee.

The invention will be described in connection with a specific embodiment of the double helix cross-wound antenna which is illustrated in FIGURES 1 and 2 and which provides the most decoupling.

The aural antenna 42 and video antenna 44 in the top bay of the radiation system are each five wavelengths in length (aperture) and have a diameter such that the circumference of each turn equals an integral number of wavelengths. The aural antenna 42, which is connected at its center to the aural energy probe 32, winds in clockwise-upward direction around the insulators 40 which encircle the circular wave guide 20 above aural energy probe 32. The video antenna 44, which is connected at its center to the video energy probe 36, winds in the same clockwise-upward direction intermediate of probes 36 and 32. The ends of each of the aural and video antennas 42 and 44 may be supported by beads.

Since the aural antenna 42 and video antenna 44 are displaced from each other by two and one-half wavelengths, the overlapping portions are cross-wound. The cross angle is preferably in the range of about twenty to about forty degrees. Grooves are cut at the cross-over points to maintain the outside and inside circumference dimensions constant. Insulation sheets made from material sold under the trade mark TEFLON insulate the antennas from each other at the cross-over points.

The lower bay comprising the aural antenna 42*a* and the video antenna 44*a* are similar in construction and are connected to the aural antenna 42 and the video antenna 44 respectively.

The cross angle is a function of the spacing of the turns and may vary from about twenty degrees to about ninety degrees depending on the length (aperture) of the helices. Similarly, the necessary spacing of the aural energy probe 32 and video energy probe 36 (and therefore the associated antennas) has to be greater than one-sixteenth of a wavelength. However, the greater the cross angle and the greater the probe spacing, the greater the longitudinal spacing of the aural antenna 42 and video antenna 44, the greater the decoupling. It was found that a cross angle of about thirty degrees with probe spacing of two and one-half wavelengths provided a very good compromise between the lengths of each bay and the amount of decoupling.

It should be noted that any reasonable number of bays may be used, for example, ten bays can readily be stacked.

It should also be noted that other coupling means besides the probes may be used to couple the energy from the wave guide to the video and aural antennas; in particular, loops may be used which are suitably orientated to be separately excited by the aural energy and the video energy. In this sense, the loops are the exact equivalent of the probes.

*Performance*

The performance of the specific two-bay embodiment of the invention illustrated in FIGURE 1 is as follows:

| | |
|---|---|
| Overall decoupling between the video an aural inputs over ±10% bandwidth | Greater than 23 db. |
| Decoupling between the video and aural inputs in the transducer alone | Greater than 40 db. |
| Decoupling between the aural and video antennas | Greater than 23 db. |
| Coupling of aural and video energy from the circular wave guide to the antenna system | 100% (50% to each bay). |
| Bandwidth | ±5%. |
| Overall impedance match: | |
| VSWR on aural input at ±2% bandwidth | Less than 1.1. |
| VSWR on video input at ±3% bandwidth | Less than 1.1. |

Antenna patterns:
- Video energy pattern—
  - Horizontal—showed a 1.5 db cyclic effect and the main null about −5 db.
  - Vertical—a half power beam width of 8 to 9 degrees. Side lobe levels less than −14 db.
- Aural energy pattern—
  - Substantially the same as the video energy pattern above.

*Conclusion*

Therefore, in accordance with the invention, an improved radio frequency energy transfer system has been provided which is particularly useful for radiating two signals having different wave lengths from the same location such as is required in television broadcasting. Further, complicated and expensive filter equipment to prevent intercoupling of energy is not needed permitting high power and better quality transmitters at a lower cost. Also, a number of bays may readily be arranged vertically to increase the area of broadcasting by lowering the angle of radiation.

While a single specific embodiment of the invention which is particularly useful for television broadcasting has been described in detail, it should be noted that the invention is equally applicable to receiving or to both transmitting or receiving radio signals of other types. Further, other embodiments of the invention may be used in radar, radio communication and radio navigation systems. Therefore, it should be apparent that many modifications and changes may readily be made without departing from the spirit and scope of the invention.

What is claimed is:

1. A system for radiating simultaneously first and second signals comprising a circular wave guide, a transducer coupled to said circular wave guide and adapted to propagate simultaneously the first and second signals in orthogonal modes in said circular wave guide, a first probe associated with and projecting into said circular wave guide, said first probe being oriented to be excited by the first signal only, a second probe associated with and projecting into said circular wave guide at a right angle to said first probe to be excited by the second signal only, a first antenna coupled to said first probe to radiate the first signal, and a second antenna coupled to said second probe to radiate the second signal said antennas having low mutual coupling.

2. A system according to claim 1 wherein the aforesaid first and second signals have different wavelengths.

3. A system for radiating simultaneously aural and video energy in a substantially omnidirectional pattern comprising a circular wave guide, a transducer coupled to said circular wave guide and adapted to propagate simultaneously the aural energy and the video energy in orthogonal modes in said circular wave guide, an aural energy probe supported by and projecting into said circular wave guide, said aural energy probe being oriented to be excited by the aural energy only, a video energy probe supported by and projecting into said circular wave guide at a right angle to said aural energy probe to be excited by the video energy only, and antenna means including aural and video elements in mutually decoupled relationship developed about said circular waveguide and coupled to said aural energy probe for radiating the aural energy in a substantially omnidirectional pattern and coupled to said video energy probe for radiating the video energy in a substantially omnidirectional pattern.

4. A system for radiating simultaneously aural and video energy in a substantially omnidirectional pattern comprising a circular wave guide, a transducer coupled to said circular wave guide and adapted to propagate simultaneously the aural energy and the video energy in orthogonal modes in said circular wave guide, an aural energy probe supported by and projecting into said circular wave guide, said aural energy probe being orientated to be excited by the aural energy, a video energy probe supported by and projecting into said circular wave guide at a right angle to said aural energy probe to be excited by the video energy, an aural antenna developed about said circular wave guide and coupled to said aural energy probe for radiating the aural energy in a substantially omnidirectional pattern, and a video antenna developed about said circular wave guide and coupled to said video energy probe for radiating the video energy in a substantially omnidirectional pattern.

5. The system of claim 4 wherein said probes are displaced from each other along said circular wave guide more than one wavelength.

6. The system of claim 4 wherein said transducer comprises a circular wave guide having a diameter to propagate a specified mode, said circular wave guide having a first rectangular opening at one end for the video energy and a second rectangular opening through its side for the aural energy, said first rectangular opening having a dimension small enough to act as a short and prevent propagation of the aural energy via said first rectangular opening.

7. The system of claim 6 wherein said second rectangular opening is positioned one-quarter wavelength away from the effective position of the short.

8. A system for radiating aural energy and video energy comprising a mast consisting of a first circular wave guide; a transducer connected to said first circular wave guide and adapted to propagate the aural energy and the video energy in orthogonal modes in said first circular wave guide, said transducer comprising a second circular wave guide having a diameter to propagate said orthogonal modes, said second circular wave guide having a first rectangular opening at one end for the video energy and a second rectangular opening through its side for the aural energy, said first rectangular opening having a dimension small enough to act as a short and prevent propagation of the aural energy via said first rectangular opening, said second rectangular opening being positioned one-quarter wavelength away from the effective position of the short; an aural energy probe supported by and projecting into said first circular wave guide, said aural energy probe being orientated to be excited by the aural energy; a video energy probe supported by and projecting into said first circular wave guide at a right angle to said aural energy probe to be excited by the video energy; insulating means supported by said first circular wave guide, an aural antenna supported by said insulating means and coupled to said aural energy probe to radiate the aural energy, and a video antenna supported by said insulating means and coupled to said video energy probe to radiate the video energy; said aural antenna comprising a helix of a given diameter wound in a given direction, said video antenna comprising a helix of the same diameter but cross-wound at a common portion, said helices crossing at an angle of about twenty to about forty degrees; said aural and video energy probes being displaced from each other along said first circular wave guide more than one wavelength.

9. The system of claim 8 including a dual mode filter positioned within said first circular wave guide above said video energy probe to pass the aural energy and reflect the video energy, and a choke short at the top of said first circular wave guide to reflect the aural energy.

10. A system for radiating simultaneouly aural and video energy comprising a circular wave guide, a transducer coupled to said circular wave guide and adapted to propagate simultaneously the aural energy and the video energy in orthogonal modes in said circular wave guide, an aural energy probe supported by and projecting into said circular wave guide, said aural energy probe being orientated to be excited by the aural energy, a video energy probe supported by and projecting into said circular wave guide at a right angle to said aural energy probe to be excited by the video energy, an aural antenna coupled to said aural energy probe to radiate the aural energy, and a video antenna coupled to said video energy probe to radiate the video energy, said aural antenna comprising a helix of a given diameter wound in a given direction and supported by said circular wave guide and said video antenna comprising a helix of the same diameter and supported by said circular wave guide, said helices having an overlapping portion in which turns of the helices cross at an angle.

11. The system of claim 10 wherein said helices cross at an angle of about twenty to about forty degrees.

References Cited in the file of this patent

UNITED STATES PATENTS

| | | |
|---|---|---|
| 2,441,574 | Jaynes | May 18, 1948 |
| 2,514,679 | Southworth | July 11, 1950 |
| 2,644,930 | Luhrs et al. | July 7, 1953 |
| 2,747,184 | Kock | May 22, 1956 |
| 2,748,352 | Miller | May 29, 1956 |
| 2,759,099 | Olive | Aug. 14, 1956 |
| 2,764,756 | Zaleski | Sept. 25, 1956 |
| 2,817,823 | Okress | Dec. 24, 1957 |

FOREIGN PATENTS

| | | |
|---|---|---|
| 724,795 | Great Britain | Feb. 23, 1955 |
| 762,415 | Great Britain | Nov. 28, 1956 |